April 25, 1933.  B. W. JONES  1,905,720
MOTOR STARTER
Filed Nov. 2, 1931
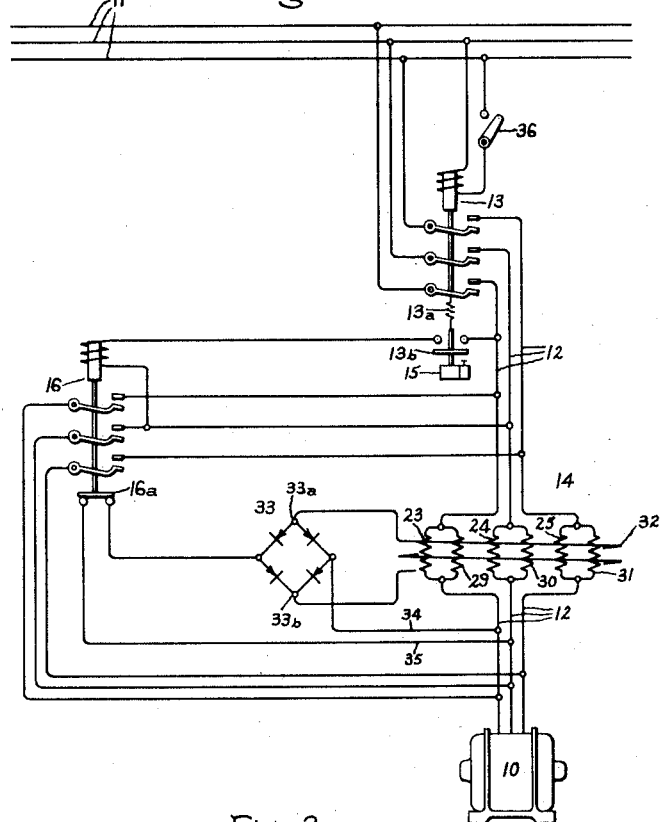
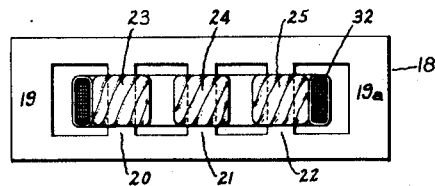
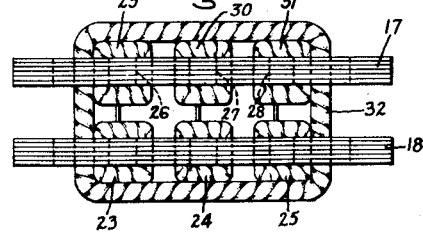
Inventor:
Benjamin W. Jones,
by Charles V. Tullar
His Attorney.

Patented Apr. 25, 1933

1,905,720

UNITED STATES PATENT OFFICE

BENJAMIN W. JONES, OF SCHENECTADY, NEW YORK, ASSIGNOR TO GENERAL ELECTRIC COMPANY, A CORPORATION OF NEW YORK

MOTOR STARTER

Application filed November 2, 1931. Serial No. 572,547.

This invention relates to electrical control systems, more particularly to systems for controlling the starting and acceleration of alternating current motors; and it has for an object the provision of a simple, reliable and improved system of this character.

More specifically the invention relates to systems employed to start electric motors which are supplied from networks carrying lighting loads in addition to motor loads, and a further object of this invention is the provision of a suitable, saturable reactor type starter for limiting the increase in the starting current drawn from the network to predetermined maximum amounts in definite intervals of time.

A more specific object of the invention is the provision of a reactor type starter for an alternating current motor in which the voltage induced by the alternating current windings in each turn of the direct current magnetizing winding is substantially neutralized and in which wave distortion of the alternating voltage applied to the motor is substantially eliminated.

A still further object of the invention is to provide a reactor type starter in which the direct current required to saturate the reactor is a minimum so that a small and inexpensive type rectifying device may be utilized to supply direct current to the saturating winding, thereby resulting in a starter of minimum size, weight and cost.

In carrying the invention into effect in one form thereof, a variable reactance device is employed to control the voltage supplied to the motor during the starting period and the reactance of this device is in turn controlled by means of a magnetizing winding which is energized when the motor is energized.

More specifically, reactor coils wound upon iron cores are included in circuit between a motor and its source of supply and the reactance of these coils is varied by means of a magnetizing winding supplied with direct current from a suitable rectifying device energized by the voltage from which the motor is supplied.

For a better and more complete understanding of the invention reference should now be had to the following specification and to the accompanying drawing in which Fig. 1 is a simple diagrammatical illustration of a system embodying the invention; Fig. 2 is an enlarged view in elevation of the saturable core reactor utilized in an embodiment of the invention and Fig. 3 is a plan view of the reactor shown in Fig. 2.

The invention is illustrated in one form thereof as embodied in a control system utilized to control the starting and acceleration of an alternating current induction motor 10. Although the motor 10 may be of any suitable type, it is conventionally illustrated as a squirrel cage motor and is supplied from any suitable source such for example as that represented in the drawing by the three supply lines 11 to which the terminals of the motor 10 are arranged to be connected by means of conductors 12 and a suitable electromagnetic switching device 13.

A suitable starting device 14 is included in the connections 12 between the switching device 13 and the terminals of the motor 10 for the purpose of controlling the voltage supplied to the motor 10 during the starting period, and limiting the increase in current drawn from the network 11 to a predetermined maximum amount in a predetermined interval of time.

After an interval of time which is sufficient to permit the motor to accelerate to full speed and which interval of time is determined by the setting of a suitable time element device 15, the starting device 14 is short circuited by any suitable means such for example as the electromagnetic switching device 16 which when operated to its closed position serves to connect the terminals of the motor 10 to the supply line 11 independently of the starter 14.

The starting device 14 is illustrated as a saturable reactor comprising alternating current coils wound upon iron cores and included in circuit between the motor 10 and its supply source together with a direct current magnetizing winding for varying the magnetization of the cores and reactance of the alternating current winding. The reactor is provided with two polyphase cores 17 and 18 made of suitable magnetic material, such for example as soft iron lamination, and arranged in parallel spaced apart relationship with each other. As shown, the cores 17 and 18 are preferably of an enclosed five legged structure; the core member 18 for example having two end legs 19 and 19a respectively and intermediate legs 20, 21 and 22 upon which reactive alternating current coils 23, 24 and 25 are respectively arranged. Similarly the core 17 is provided with intermediate legs 26, 27 and 28 upon which reactive alternating current coils 29, 30 and 31 are respectively arranged.

The reactance of an iron core reactor is a function of the saturation, i. e., the density of the flux of the core, because of the variable permeability of iron. The saturation curve of an iron core reactor shows that the reactance decreases as the saturation increases and, consequently, if the core of such a reactor is magnetized by a direct current magnetic flux, the impedance of the reactor winding is decreased as the flux density is increased. The cores 17 and 18 are magnetized by means of a direct current winding 32 having a large number of turns of fine wire, and consequently a high turn ratio with respect to the number of turns of the alternating current coils. As shown in the drawing the magnetizing winding 32 is disposed upon the cores 17 and 18 so that it completely surrounds the alternating current coils arranged upon the intermediate legs of the cores and it is supplied with direct current proportional to the voltage applied to terminals of the motor 10 by means of a suitable rectifying device 33, the supply connections 34 and 35 for which are preferably connected across one phase of the connection 12 between the starting device 14 and the motor 10. Since the winding 32 has a large number of turns, only a relatively small current is required to saturate the cores 17 and 18.

An advantage of arranging the magnetizing coil 32 so as to surround the alternating current windings of the reactor is that since the algebraic sum of the magnetic fluxes of any three-phase balanced magnetic circuit is equal to zero, no voltage will be induced in the magnetizing winding 32 by the alternating current winding. This feature is especially desirable in view of the high turn ratio between the direct current and alternating current windings.

If a single reactor coil is connected in an alternating current circuit and its core magnetized by direct current the wave shape of the resultant terminal voltage is not a pure sinusoid, but on the contrary is considerably distorted; one half of the wave being steeply peaked and the other half being noticeably flattened, but of equal area. This distortion of the terminal voltage wave shape is due to the fact that during one-half cycle of the alternating current wave, the alternating magnetic flux and the direct current magnetic flux have the same direction and assist each other, whilst in the subsequent half-cycle their directions are opposite and they oppose each other. In order to eliminate this distortion of the resultant voltage wave, the alternating current windings upon the corresponding phase legs of the cores 17 and 18 are connected in parallel with each other and are arranged upon their respective core legs so that the polarity relationship between the direct current and alternating current magnetizations of one core are opposite to the polarity relationship between the direct and alternating current magnetizations of the other core; that is to say, the arrangement of the polarities of the alternating current coils is such that at any instant when the alternating current flux in a leg of one of the cores is in the same direction as the direct current flux in that leg, the alternating current flux in the corresponding phase leg of the other core is in the opposite direction with respect to the direct current flux in that leg, and since the alternating current windings on the corresponding phase legs of the cores are connected in parallel with each other, the resultant voltage wave is symmetrical.

Although the rectifying device 33 may be of any suitable type it is preferably a full wave rectifying bridge, the respective arms of which are copper oxide units and to the opposite equipotential points 33a and 33b of which the magnetizing winding 32 is connected as illustrated in the drawing. The electromagnetic switching device 16 is provided with an interlock 16a which in the upper or closed position of the switching device interrupts the supply connection to the bridge 33 thereby deenergizing the bridge and the magnetizing winding 32. The copper oxide rectifying units of the bridge 33 can stand a very heavy overload for a short time and consequently the provision of means for deenergizing the bridge after the motor has accelerated to full speed together with the large number of turns of the magnetizing winding 32 makes possible the utilization of a rectifying bridge of minimum size and cost.

With the above understanding of the apparatus and its organization in the system, the operation of the system will readily be understood from the description which follows:

To start the motor 10 the manually operated switching device 36 is first operated to its closed position in which it completes an energizing circuit for the operating coil of contactor 13; this circuit being readily traced through the operating coil of the contactor from the lower to the middle supply line 11. Contactor 13 in responding to the energization of its operating coil moves to the upper or closed position in which it establishes connections between the terminals of the motor 10 and the supply line 11 with the alternating current coils of the reactor 14 included in circuit.

Just previous to the operation of the line contactor 13 to its closed position, no voltage exists at the motor terminals of the reactor and consequently no direct current is supplied from the rectifying bridge 33 to the magnetizing winding 32. The reactance of the reactor is, therefore, maximum and consequently when the line contactor 13 is operated to the closed position there is a very large reactive drop across the alternating current winding of the reactor and the voltage applied to the motor terminals is very small.

As voltage appears at the motor terminals of the alternating current reactor coils the bridge 33 starts rectifying this alternating voltage and supplying to the magnetizing winding 32 a direct current proportional to the voltage applied to the motor 10. The flow of a direct current in the winding 32 magnetizes the core members 17 and 18 proportionally and as a result the reactive drop across the reactor windings is decreased and the current supplied to the motor 10 increased. The speed of the motor is correspondingly increased. Due to the increase in voltage applied to the motor 10 the direct current supplied to the magnetizing winding 32 by the bridge 33 is increased thus resulting in a further decrease in the reactance of the reactor winding and a further increase in the current supplied to the motor 10.

This process is cumulative and the direct current magnetization of the cores 17 and 18 is increased to the saturation point and the reactive drop across the reactor coils are reduced to a minimum at which time the motor 10 will have accelerated to approximately full speed.

The electrical constants of the saturable reactor 14 are so chosen that the initial inrush of current to the motor 10 is limited to a predetermined value such for example as one hundred amperes and the increase of current is limited to a predetermined amount in a predetermined interval of time, for example one hundred amperes per half second.

The operation of the line contactor 13 to its closed position places the spring 13ₐ under tension thus tending to move the movable contact 13ᵦ in an upward direction and after a time interval determined by the setting of the oil dash pot 15 the movable contact member 13ᵦ engages with its cooperating stationary contact and establishes an energizing circuit for the operating coil of contactor 16; this circuit being traced from the left-hand conductor 12 through contacts 13ᵦ (in the closed position thereof) operating coil of contact 16 and thence to the middle conductor 12. Contactor 16 in responding to the energization of its operating coil moves to the upper or closed position in which it short circuits the saturable reactor 14 and connects the terminals of the conductor 10 directly to the line.

As the contactor 16 moves to its closed position its auxiliary interlock 16ₐ is disengaged from its cooperating stationary contacts thus interrupting the connections between the bridge 33 and the connections 12 and deenergizing the bridge and the magnetizing winding 32 which is supplied therefrom.

Although in accordance with the provisions of the patent statutes I have described this invention as embodied in concrete form, I would have it understood that the elements and connections shown in the drawing are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:—

1. A motor starting system comprising an electric motor, means for supplying a voltage to said motor, means for progressively increasing the voltage supplied to said motor to the starting value comprising a variable magnetization reactance device and means responsive to an increase in the terminal voltage of said motor by said supply means for controlling the magnetization of said reactance device to provide a further increase in the voltage supplied to said motor.

2. A motor starting system comprising an alternating current motor, connections from said motor to a supply source, means for gradually varying the voltage supplied to said motor from zero to the starting value comprising a variable magnetization reactance device provided with a magnetization control winding, and rectifying means energized by the terminal voltage of said motor for supplying a direct current to said winding to decrease the reactance of said device in response to an increase in the motor terminal voltage.

3. A motor starting system comprising an alternating current motor, connections from said motor to a supply source for supplying an alternating voltage to said motor, means for increasing the current supplied to said motor to the starting value comprising a variable magnetization reactance device provided with a control winding, and means comprising a rectifying bridge circuit connected to said motor connections for supplying a direct current to said winding so as to increase the current supplied to said motor in response to increment of the motor terminal voltage.

4. A motor starting system an alternating current motor, connections including a switching device for connecting said motor to a supply source, means for progressively increasing the current supplied to said motor to the starting value comprising a variable reactance device provided with a control winding, a rectifying device energized from the voltage supplied to said motor for supplying a direct current to said winding to decerase the reactance of said device in response to an increase in the motor terminal voltage, and means for de-energizing said rectifying device.

5. A motor starting system comprising a source of alternating current, an alternating current motor, connections including a contactor for connecting said motor to said source, means for varying the voltage supplied to said motor comprising a variable reactance device included in said connections and provided with a control winding, an electric circuit connected to said connections between said device and said motor and a copper oxide rectifying bridge included in said circuit for supplying a direct current to said control winding, and a second contactor for short circuiting said reactance and interrupting said bridge circuit.

6. A motor starter comprising a variable reactance device provided with line connections and with motor connections and having a magnetizing winding, and a rectifying device connected to said motor connections for supplying direct current to said winding thereby to increase the current supplied to the motor in response to an increase in the motor terminal voltage.

7. A motor starter comprising a variable magnetization reactance device having a magnetization control winding and provided with line connection terminals and motor connection terminals, electrical connections from said motor connection terminals to said control winding, and a rectifying bridge included in said connections for supplying a direct current to said control winding thereby to increase the current supplied to the motor in response to an increase of the motor terminal voltage.

8. In a motor starter, a variable reactance device comprising a plurality of magnetic core legs, a direct current magnetizing winding for said core legs, and a plurality of alternating current windings, one for each core leg, each provided with line and motor connections and arranged on said core legs so that the polarity relationship between the direct and alternating magnetizations of certain of said core legs is opposite to that of the remaining core legs, an electrical connection from said motor connections to said magnetizing winding including a rectifying device for supplying a direct current to said magnetizing winding to decrease the reactance of said device in response to an increase in the terminal voltage of said motor.

9. In an alternating current motor starter, a variable reactance device for varying the current supplied to said motor from zero to the starting value, said device having at least two magnetic cores each provided with an alternating current winding having line and motor connections, a direct current magnetizing winding for said cores, said alternating current windings being connected in parallel and arranged on said cores so that the polarity relationship between the direct and alternating magnetizations of one of said cores is opposite to that of another of said cores, and electrical connections, including a rectifying device, from said motor connections to said direct current winding for supplying direct current to said direct current winding to decrease the reactance of said device in response to an increase in the terminal voltage of said motor.

10. In an alternating current motor starter, a variable reactance device for gradually increasing the voltage supplied to the motor comprising a polyphase magnetic core having at least three legs provided with alternating current windings having three phase line connections and motor connections, a direct current magnetizing winding surrounding all of said alternating current windings so as to be linked by the total flux of said alternating current windings, and electrical connections, including a rectifying device from said motor connections to said direct current winding for supplying direct current winding to decrease the reactance of said device in response to an increase in the terminal voltage of the motor.

11. A starter for an alternating current motor comprising a pair of polyphase magnetic cores each having at least three legs provided with alternating current windings having three phase line connections and motor connections, a direct current magnetizing winding surrounding all said alternating current windings on both of said cores, the alternating current windings on corresponding phase legs being connected in parallel and arranged on their respective core legs to provide opposite polarity relationships between the direct and alternating current magnetizations of the corresponding phase legs of said cores, and electrical connections from said motor connections to said magnetizing winding including a copper oxide rectifying bridge for supplying direct current to said magnetizing winding to decrease the reactance of said reactance device in response to an increase in the motor terminal voltage.

In witness whereof, I have hereunto set my hand.

BENJAMIN W. JONES.

CERTIFICATE OF CORRECTION.

Patent No. 1,905,720.                              April 25, 1933.

BENJAMIN W. JONES.

It is hereby certified that error appears in the printed specification of the above numbered patent requiring correction as follows: Page 4, line 111, claim 10, before "winding" insert the words "to said direct current"; and that the said Letters Patent should be read with this correction therein that the same may conform to the record of the case in the Patent Office.

Signed and sealed this 30th day of May, A. D. 1933.

(Seal)

M. J. Moore.
Acting Commissioner of Patents.